(12) United States Patent
Hoff et al.

(10) Patent No.: US 11,619,276 B2
(45) Date of Patent: Apr. 4, 2023

(54) WAVE SPRING BODY INCLUDING FINGERS

(71) Applicant: Schaeffler Technologies AG & Co. KG, Herzogenaurach (DE)

(72) Inventors: Austin Hoff, New Franklin, OH (US); Kelly Gabor, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 446 days.

(21) Appl. No.: 16/736,189

(22) Filed: Jan. 7, 2020

(65) Prior Publication Data

US 2021/0207675 A1    Jul. 8, 2021

(51) Int. Cl.
| | |
|---|---|
| *F16F 1/32* | (2006.01) |
| *F16D 1/00* | (2006.01) |
| *F16F 15/121* | (2006.01) |
| *F16F 15/12* | (2006.01) |

(52) U.S. Cl.
CPC ............... *F16F 1/328* (2013.01); *F16D 1/00* (2013.01); *F16F 15/121* (2013.01); *F16F 15/1201* (2013.01); *F16D 2300/22* (2013.01); *F16F 2226/047* (2013.01)

(58) Field of Classification Search
CPC ...... F16F 1/328; F16D 3/12; F16H 2045/0236; F16H 2045/0221
See application file for complete search history.

(56) References Cited

U.S. PATENT DOCUMENTS

| | | | |
|---|---|---|---|
| 3,314,512 A | 4/1967 | Kerestury | |
| 5,482,151 A * | 1/1996 | Ookubo | ................ F16H 45/02 192/3.29 |
| 2011/0278121 A1 * | 11/2011 | Lindemann | ......... F16F 15/1292 192/3.21 |
| 2017/0211673 A1 * | 7/2017 | Norwich | ................. F16H 45/02 |

FOREIGN PATENT DOCUMENTS

DE          19919414 A1 * 11/2000  ............. F16D 13/64

* cited by examiner

*Primary Examiner* — Abiy Teka
(74) *Attorney, Agent, or Firm* — Volpe and Koenig, P.C.

(57) ABSTRACT

A wave spring is disclosed herein that creates hysteresis between two components. The wave spring includes an annular body having a wave-shaped profile, and a plurality of axially extending fingers extending from the annular body. The wave spring is dimensioned to be received in a space between at least two axially opposed hub components.

20 Claims, 6 Drawing Sheets

WAVE SPRING BODY INCLUDING FINGERS

FIELD OF INVENTION

The present disclosure relates to a wave spring, and more specifically relates to a wave spring for providing hysteresis between two components.

BACKGROUND

Hub assemblies are well-known, and multiple designs have been proposed to control the amount of hysteresis in these assemblies.

One such design includes a spring for providing an axial bias between two members in the hub assembly. Existing arrangements, such as this type of design do not provide the correct amount of hysteresis across an entire tolerance range, are not durable enough to withstand actual use conditions. Due to the limitations of these designs, the wave springs typically experience unacceptable deflection, or suffer from misalignment during installation.

It would be desirable to provide an improved spring that allows for a variance in a spring load and hysteresis while being installed in a gap that has a relatively large tolerance.

SUMMARY

A wave spring is disclosed herein that creates hysteresis between two components. In one embodiment, the two components are a turbine damper or turbine hub and a flange or a cover plate/flange hub. The wave spring disclosed herein achieves a specified range of hysteresis within allowable limits for both the maximum and minimum gap between the two components.

The wave spring includes an annular body having a wave-shaped profile, and a plurality of axially extending fingers extending from the annular body. The wave spring is dimensioned to be received in a space between at least two axially opposed hub components.

In one embodiment, the plurality of axially extending fingers are equally angularly spaced from each other. The plurality of axially extending fingers can include three fingers.

The wave spring has a first axial height (h1) in an uninstalled state, and the plurality of axially extending fingers have an axial extent (d) that is at least three times greater than the first axial height (h1). The axial extent (d) of the plurality of axially extending fingers is at least five times greater than the first axial height (h1).

The wave-shaped profile consists of three fluctuations. In one embodiment, the plurality of axially extending fingers are defined on a radially inner edge of the annular body.

In one embodiment, the wave spring has a uniform thickness. In one embodiment, the spring body is formed by blanking and stamping.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. "Axially" refers to a direction along the axis of an assembly. "Radially" refers to a direction inward and outward from the axis of the assembly. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Each of FIGS. 1A-2G illustrate a wave spring 2. The wave spring 2 includes an annular body 10 having a wave-shaped profile, and a plurality of axially extending fingers 20 extending from the annular body 10. The wave spring 2 is generally dimensioned to be received in a space between at least two axially opposed hub components, which are described in more detail herein. Although the wave spring 2 is illustrated in between a specific set of hub components, one of ordinary skill in the art would understand based on the present disclosure that the wave spring 2 can be positioned within any type of assembly, such as a torque converter, damper, or clutch arrangement.

The plurality of axially extending fingers 20 are defined on a radially inner edge of the annular body 10. The plurality of axially extending fingers 20 are equally angularly spaced from each other. In one embodiment, the plurality of axially extending fingers 20 includes three fingers. One of ordinary skill in the art would understand that the quantity of fingers 20 can be varied.

Figure 2A:
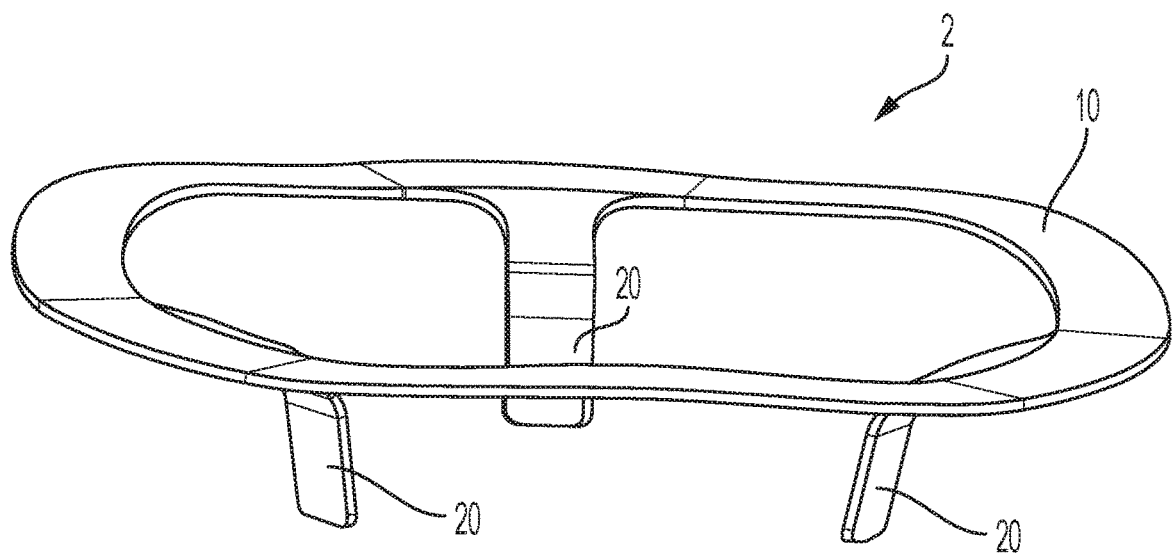
FIG. 2A is a perspective view of the wave spring of FIGS. 1A and 1B.
Figure 2B:
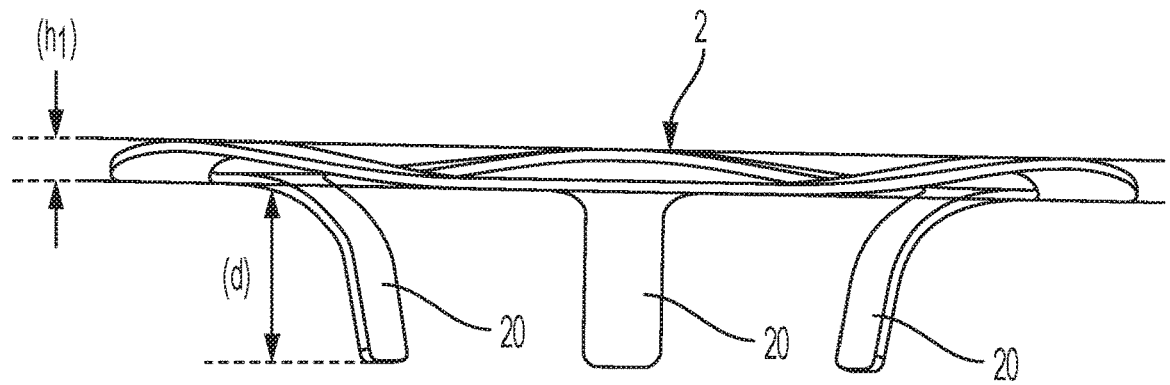
FIG. 2B is a side view of the wave spring in an uninstalled state.
Figure 2C:
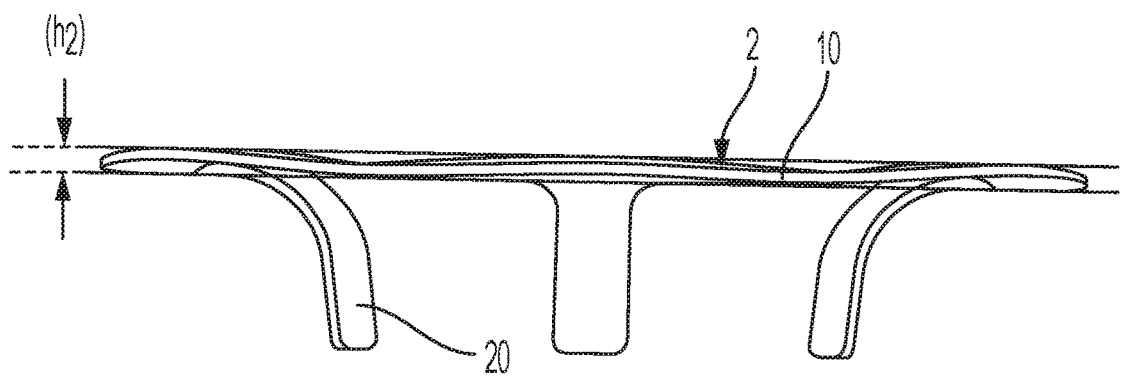
FIG. 2C is a side view of the wave spring in an installed state.
Figure 2E:
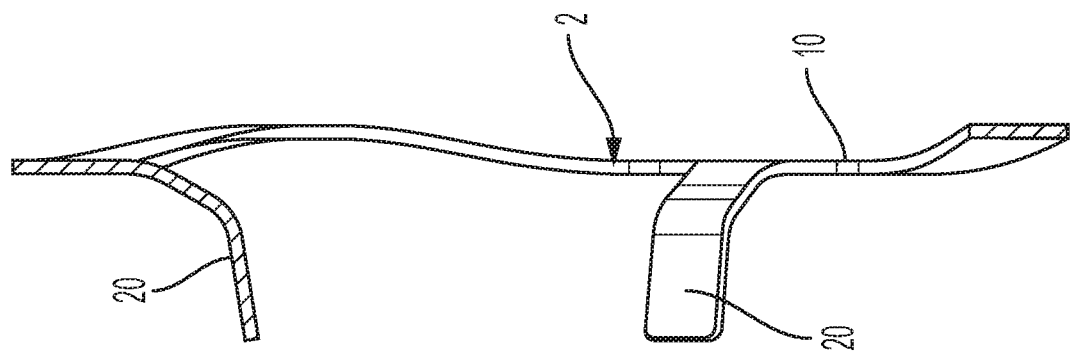
FIG. 2E is a partial cross-sectional view of the wave spring of FIG. 2D along line 2E-2E.
Figure 2D:
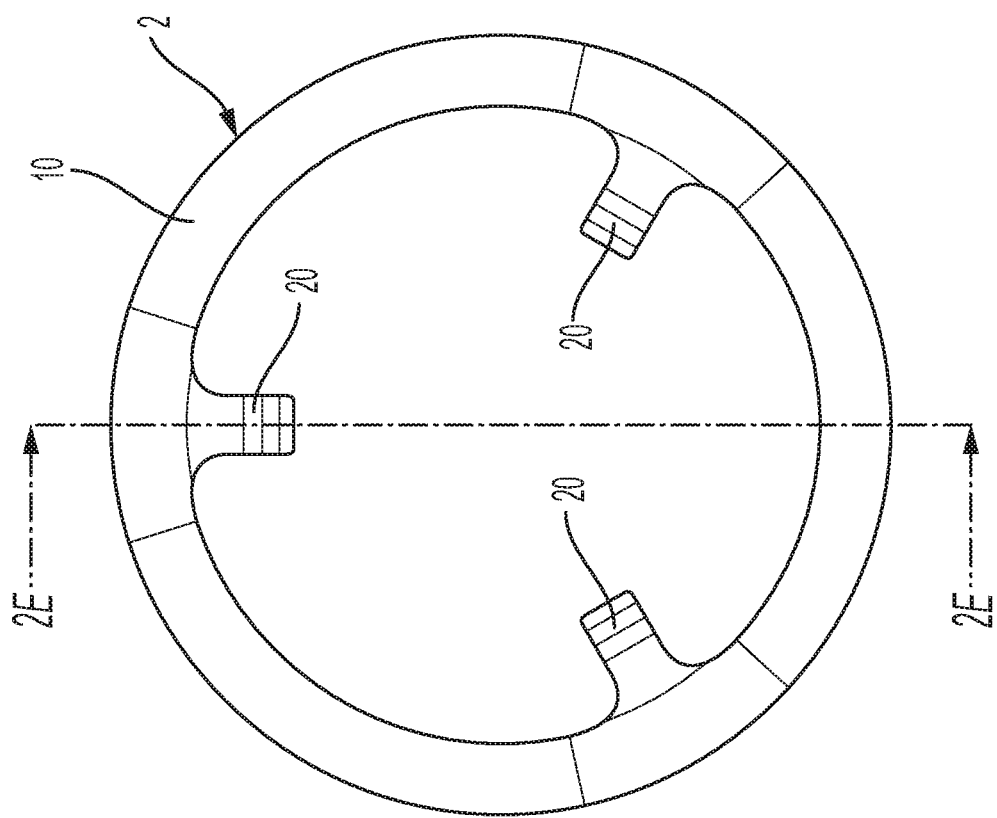
FIG. 2D is a front view of the wave spring.
Figure 2F:
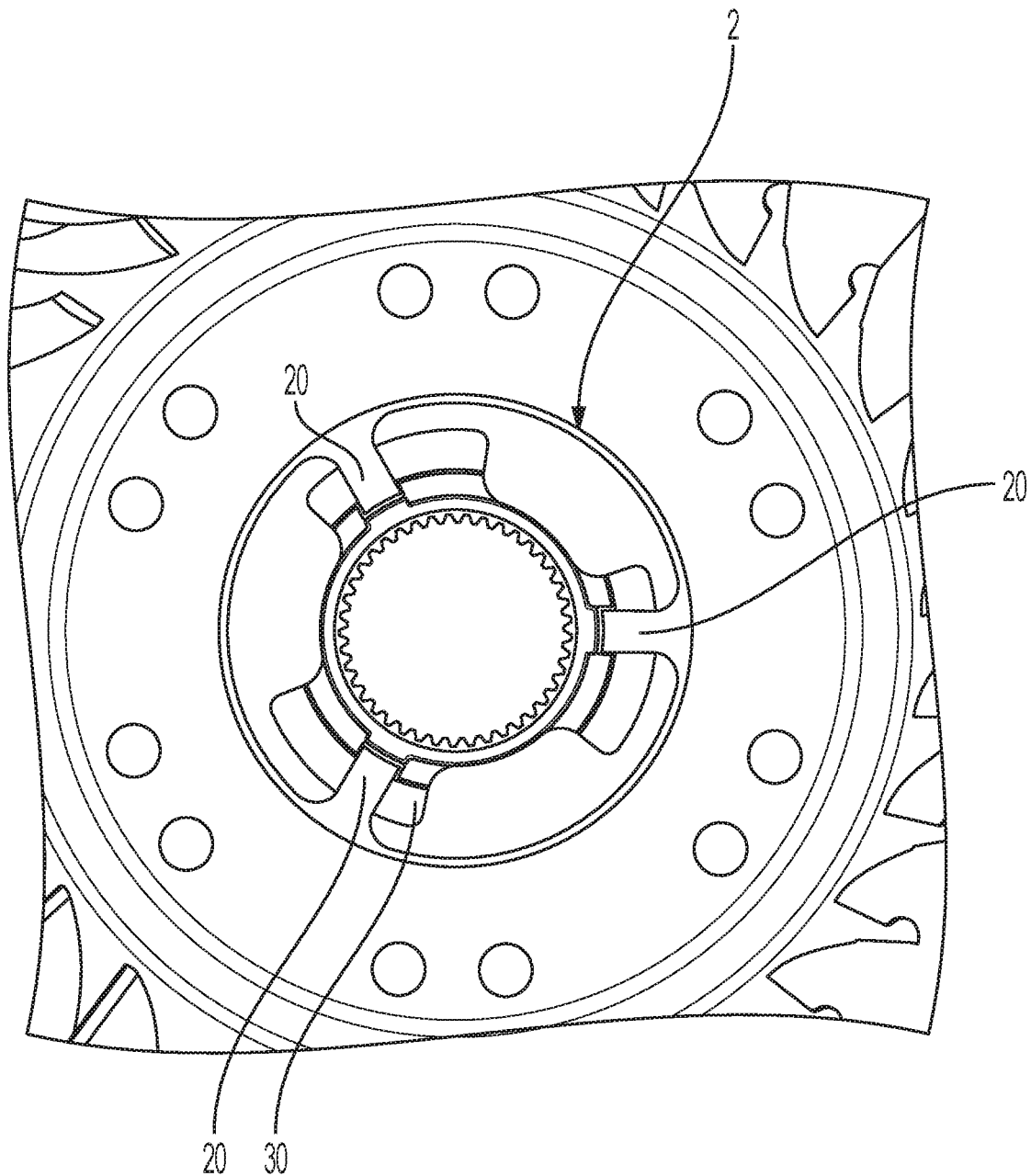
FIG. 2F is a front view of the wave spring of FIG. 2D in an installed state.
Figure 2G:
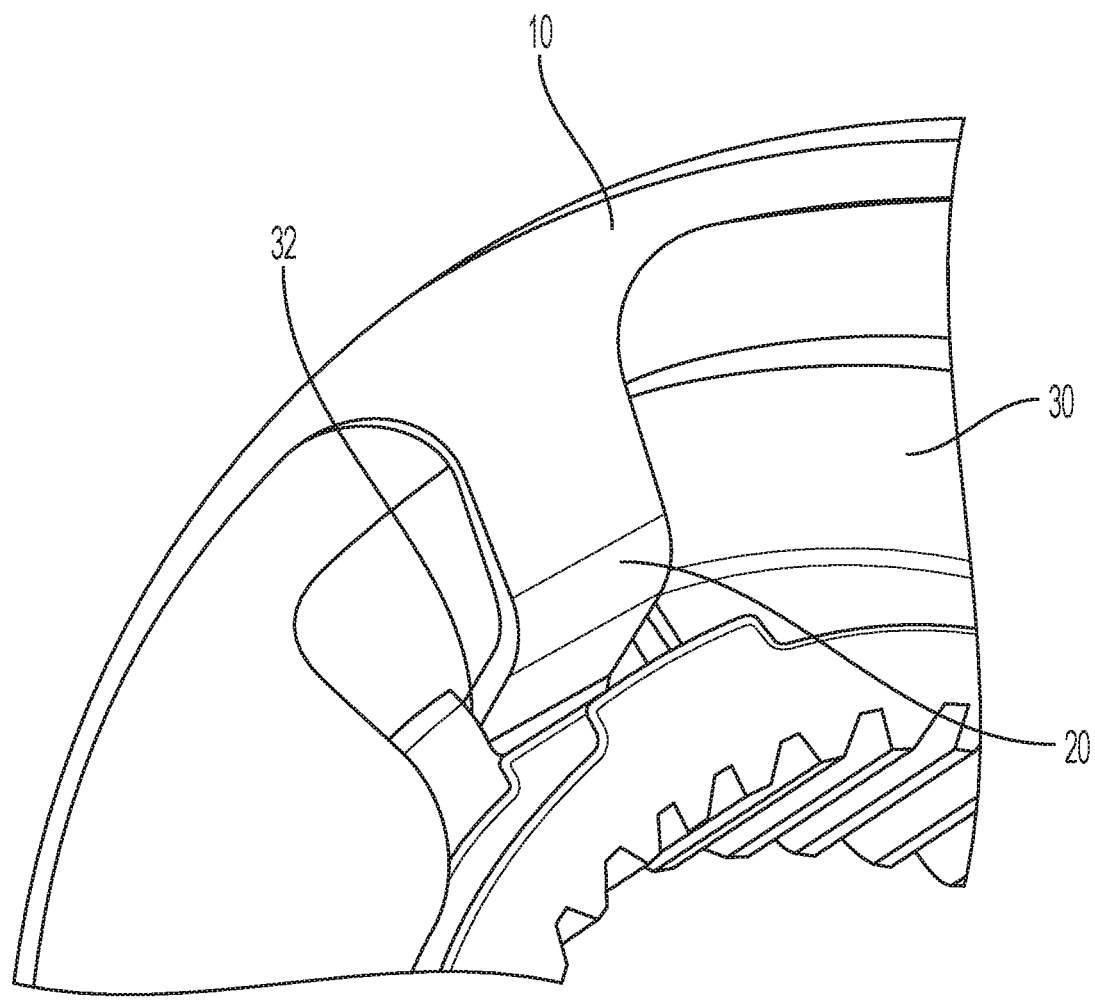
FIG. 2G is a magnified perspective view of the wave spring of FIG. 2F.

As shown in FIG. 2B, the wave spring 2 has a first axial height (h1) in an uninstalled state, and the plurality of axially extending fingers 20 have an axial extent (d) that is at least three times greater than the first axial height (h1). In one embodiment, the axial extent (d) of the plurality of axially extending fingers 20 is at least five times greater than the first axial height (h1). The term uninstalled state is used herein to refer to a state in which the wave spring 2 is not engaged with any other component.

The axial height of the wave spring 2 is due to the wave-shaped profile of the annular body 10. As shown in the drawings, the wave-shaped profile of the annular body 10 consists of three fluctuations or waves. One of ordinary skill in the art would understand from the present disclosure that the number of fluctuations or waves can be varied.

As shown in the drawings illustrating a cross-section, the wave spring 2 has a uniform thickness. In one embodiment, the wave spring 2 is formed by blanking and stamping. One of ordinary skill in the art would understand that the wave spring 2 can be formed according to other formation processes.

Figure 1A:
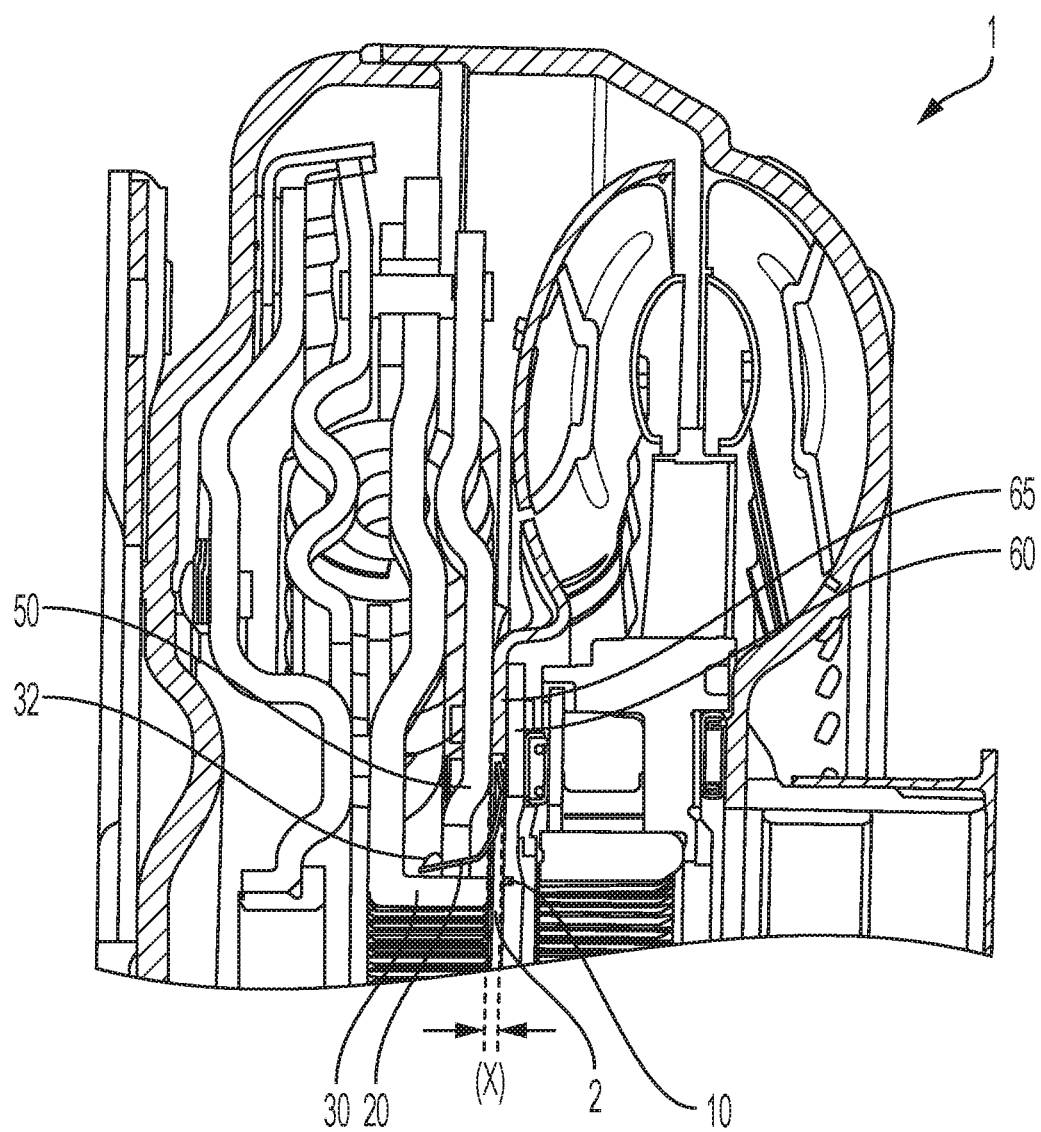
FIG. 1A is a cross-sectional view of a hub assembly including a wave spring according to one embodiment.
Figure 1B:
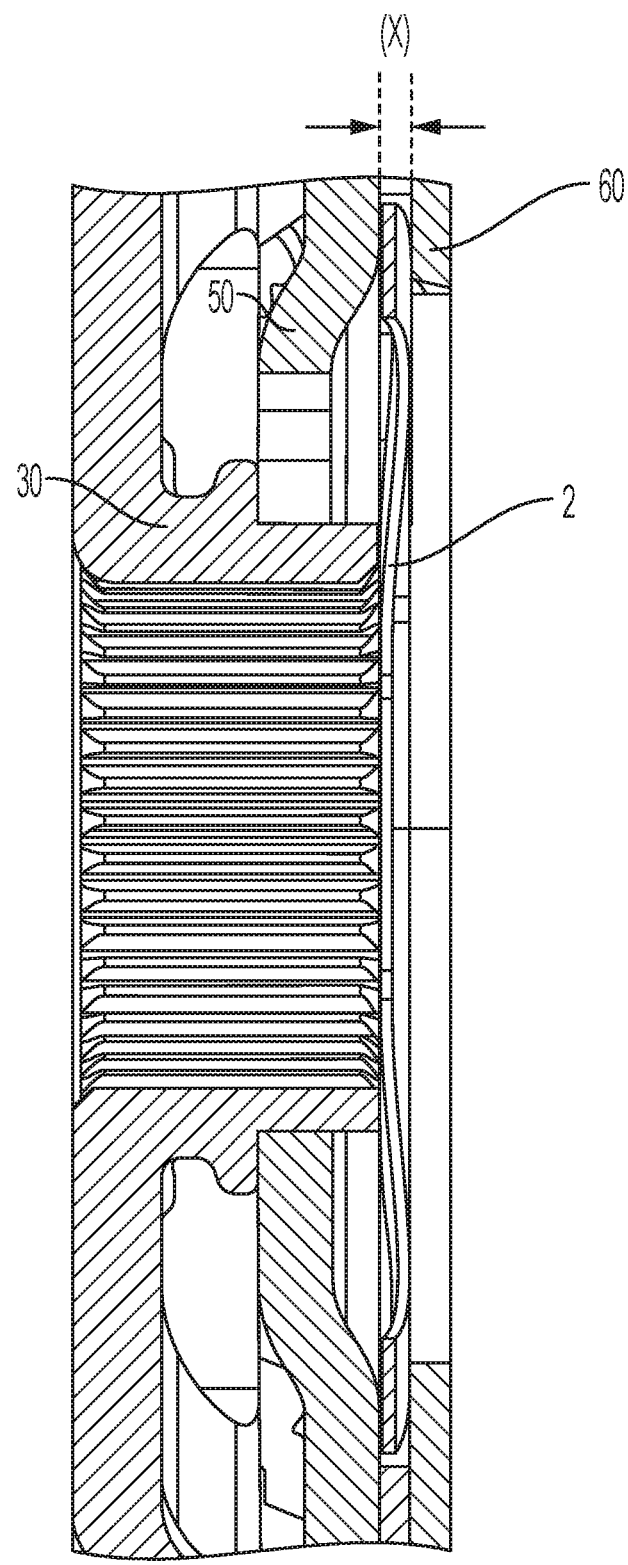
FIG. 1B is a magnified cross-sectional view of the hub assembly of FIG. 1A.

As shown more clearly in FIGS. 1A and 1B, a hub assembly 1 is illustrated that includes the wave spring 2 described in detail herein. The hub assembly 1 includes a cover plate 50 and a flange hub 30 both arranged on a first axial side of the wave spring 2. An opening or slot 32 is defined on the flange hub 30 and the opening or slot 32 is dimensioned to receive at least one of the plurality of axially extending fingers 20 formed on the wave spring 2. Engagement between the fingers 20 and the opening or slot 32 transfers rotational movement between the wave spring 2 and the flange hub 30. In one embodiment, the flange hub 30 has three openings or slots to correspond to the number of fingers 20 of the wave spring 2. However, the exact configuration of the openings or slots 32 can be varied.

A turbine hub 60 is arranged on a second axial side of the wave spring 2, such that a predetermined gap (X), shown in FIGS. 1A and 1B, is defined between the cover plate 50 and the turbine hub 60 and the wave spring 2 is arranged within the predetermined gap (X). The turbine hub 60 includes a turbine shell plate 65. The predetermined gap (X) is determined by a thickness of the turbine shell plate 65 and a tolerance, which is determined by a corresponding spacing defined between the turbine hub 60, wave spring 2, cover plate 50, and turbine shell plate 65, after these components are connected to each other.

The wave spring 2 provides friction between the components on either axial side of the wave spring 2, i.e. between the cover plate 50 and the turbine hub 60. The cover plate 50 and the turbine hub 60 are rotationally driven at the same speed, and the wave spring 2 dampers vibrations between (i) the cover plate 50/turbine hub 60 assembly and (ii) the flange 30. As shown in FIG. 1A, the cover plate 50 and the turbine hub 60 are riveted together such that both components experience the same vibrations.

The wave spring 2 disclosed herein does not distort or bend the plurality of axially extending fingers 20 during installation. During installation, the wave spring 2 is compressed in the predetermined gap. The profile of the wave spring 2 is designed such that over the entire tolerance of the predetermined gap, the wave spring has a specified load range. The specified load range is dependent on a predetermined gap tolerance, which is based on tolerances for the following values: a thickness of the turbine shell 65 (including a tolerance of ±0.12 mm), a width of the turbine hub 60 and cover plate 50, and a stamped height of the wave spring 2 (including a tolerance of ±0.2 mm).

Based on the design of the wave spring 2 disclosed herein, the wave spring 2 is deflected by less than 0.07 mm during installation. This minimal deflection is due to the wave spring 2 only compressing axially. The wave spring 2 disclosed herein is designed such that a pivot point is not required to create the spring load. All loading comes from compression of the wave shape of the wave spring 2 in the circumferential direction, resulting in negligible deflection of the fingers 20.

A method of creating hysteresis via friction between two axially opposed components is also disclosed. In one embodiment, the two axially opposed components are a turbine damper (i.e. turbine hub 60) and a flange (i.e. flange formed on hub 30). However, one of ordinary skill in the art would understand that the wave spring 10 can be used in a wide variety of applications in which two rotating components are being driven and it is desirable to damper vibrations between the rotating components.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Hub assembly 1
Wave spring 2
Annular body 10
Plurality of axially extending fingers 20
Hub 30
Opening or slot 32
Cover plate 50
Turbine hub 60
Turbine shell plate 65

What is claimed is:

1. A wave spring comprising:
   an annular body having a wave-shaped profile that defines a first axial height (h1) in an uninstalled state, wherein the annular body includes at least one trough and at least one crest that is axially and circumferentially spaced from the at least one trough, and wherein the first axial height (h1) is defined between the at least one trough and the at least one crest, and
   a plurality of axially extending fingers extending from a radially inner edge of the annular body, the plurality of axially extending fingers having an axial extent (d) that is greater than the first axial height (h1), and the wave spring being dimensioned to be received in a space between at least two axially opposed hub components;
   wherein the wave spring, in an installed state, has a second axial height (h2) extending from the at least one trough to the at least one crest, the second axial height (h2) being less than the first axial height (h1).

2. The wave spring of claim 1, wherein the plurality of axially extending fingers are equally angularly spaced from each other.

3. The wave spring of claim 1, wherein the plurality of axially extending fingers includes three fingers.

4. The wave spring of claim 1, wherein the axial extent (d) is at least three times greater than the first axial height (h1).

5. The wave spring of claim 1, wherein the axial extent (d) of the plurality of axially extending fingers is at least five times greater than the first axial height ($h_1$).

6. The wave spring of claim 1, wherein the wave-shaped profile consists of three fluctuations.

7. The wave spring of claim 1, wherein the wave spring has a uniform thickness.

8. The wave spring of claim 1, wherein the wave spring is formed by blanking and stamping.

9. An assembly including the wave spring of claim 1, the assembly further comprising two axially opposed rotating components, wherein the wave spring is frictionally engaged with both of the two axially opposed rotating components.

10. The wave spring of claim 1, wherein the at least one crest includes a plurality of crests spaced from each other circumferentially around the annular body and the at least one trough includes a plurality of troughs spaced from each other circumferentially around the annular body, each trough being arranged between adjacent crests and being axially spaced from adjacent crests.

11. The wave spring of claim 10, wherein the axially extending fingers each extend from one respective trough of the plurality of troughs.

12. A hub assembly comprising:
- a wave spring including an annular body having a wave-shaped profile that defines a first axial height (h1) in an uninstalled state, and a plurality of axially extending fingers extending from a radially inner edge of the annular body, the plurality of axially extending fingers having an axial extent (d) that is greater than the first axial height (h1), wherein the annular body includes at least one trough and at least one crest that is axially and circumferentially spaced from the at least one trough, and wherein the first axial height (h1) is defined between the at least one trough and the at least one crest;
- a cover plate and a flange hub both arranged on a first axial side of the wave spring, an opening being defined between the cover plate and the flange hub and the opening being dimensioned to receive at least one of the plurality of axially extending fingers, and
- a turbine hub arranged on a second axial side of the wave spring,
- such that a predetermined gap is defined between the cover plate and the turbine hub and the wave spring is arranged within the predetermined gap.

13. The hub assembly of claim 12, wherein the plurality of axially extending fingers are equally angularly spaced from each other, and the plurality of axially extending fingers includes three fingers.

14. The hub assembly of claim 12, wherein the axial extent (d) is at least three times greater than the first axial height (h1).

15. The hub assembly of claim 12, wherein the wave-shaped profile consists of three fluctuations.

16. The hub assembly of claim 12, wherein the wave spring has a uniform thickness, and the wave spring is formed by blanking and stamping.

17. A wave spring comprising:
- an annular body having a wave-shaped profile that defines a first axial height (h1) in an uninstalled state; and
- a plurality of axially extending fingers extending from the annular body, the plurality of axially extending fingers having an axial extent (d) that is at least three times greater than the first axial height (h1), and the wave spring being dimensioned to be received in a space between at least two axially opposed hub components.

18. The wave spring of claim 17, wherein:
- the plurality of axially extending fingers are defined on a radially inner edge of the annular body;
- the plurality of axially extending fingers are equally angularly spaced from each other about the annular body; and
- the plurality of axially extending fingers includes three fingers.

19. The wave spring of claim 17, wherein the wave-shaped profile consists of three fluctuations, and wherein the wave spring has a uniform thickness.

20. The wave spring of claim 17, wherein the axial extent (d) of the plurality of axially extending fingers is at least five times greater than the first axial height (h1).

* * * * *